United States Patent [19]

Jacobs

[11] 4,257,736
[45] Mar. 24, 1981

[54] GOVERNED PROPELLER TYPE WIND MOTOR ARRANGEMENT

[76] Inventor: Dennis Jacobs, Rte. 1, Box 171D, Audubon, Minn. 56511

[21] Appl. No.: 20,344

[22] Filed: Mar. 14, 1979

[51] Int. Cl.³ .............................................. F03D 7/04
[52] U.S. Cl. ........................................ 416/51; 416/89
[58] Field of Search ................. 416/51 A, 133, 132 B, 416/41, 44 A, 89 A

[56] References Cited

U.S. PATENT DOCUMENTS

| | | | |
|---|---|---|---|
| 188,743 | 3/1877 | Lochhead | 416/51 A |
| 259,476 | 6/1882 | Bryan | 416/133 |
| 650,032 | 5/1900 | Benson | 416/51 A |
| 1,482,690 | 2/1924 | Lanzius | 416/51 A |
| 1,555,349 | 9/1925 | Ballow | 416/133 |
| 1,855,220 | 4/1932 | Buchser | 416/51 A |
| 2,126,202 | 8/1938 | McColly | 416/51 A |
| 2,688,285 | 9/1954 | Stockett et al. | 416/51 A X |
| 3,469,633 | 9/1969 | Arondoglio | 416/51 A |

*Primary Examiner*—Everette A. Powell, Jr.
*Attorney, Agent, or Firm*—Craig and Antonelli

[57] ABSTRACT

A propeller type wind motor arrangement having a blade mounting hub, a plurality of air foil blades, and blade receiving means for mounting the blades to the hub for pivotal movement about a longitudinal axis of the blades is provided with a governor for retaining the blades at a first high torque, relatively low tip speed ratio forming angle during motor start-up and at rotational speeds below a minimum normal operational speed, and for abruptly shifting said blades to a second high efficiency, relatively high tip speed ratio forming angle when said operational value is reached.

11 Claims, 16 Drawing Figures

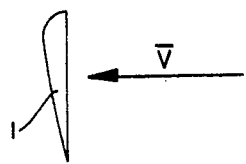
FIG. 1a.
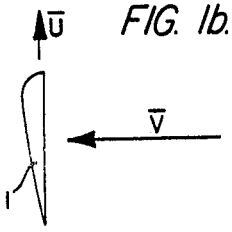
FIG. 1b.
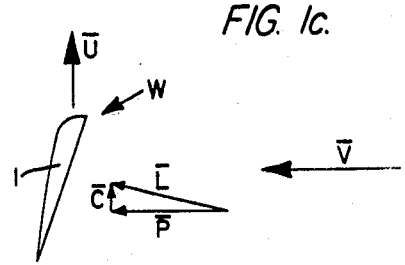
FIG. 1c.
FIG. 1d.
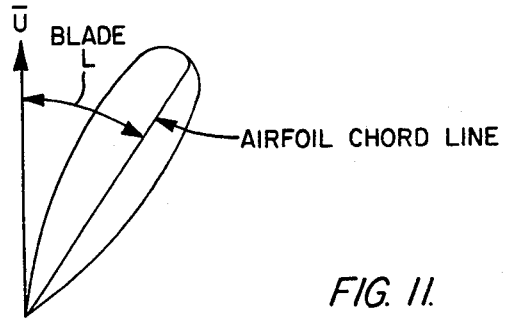
FIG. 10.
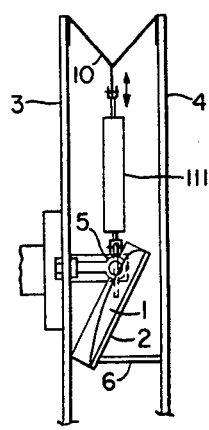
FIG. 11.
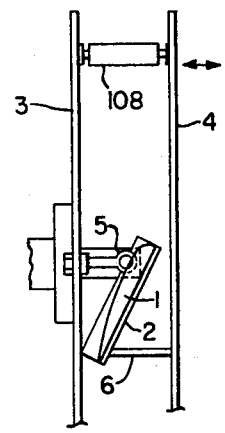
FIG. 2a.
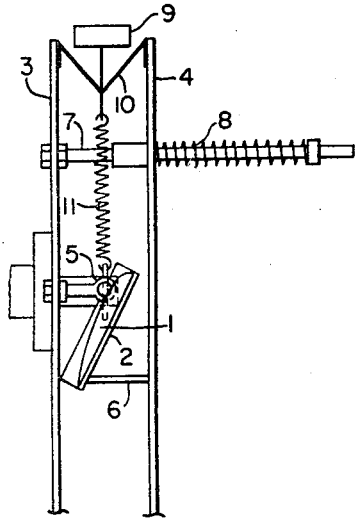
FIG. 2b.
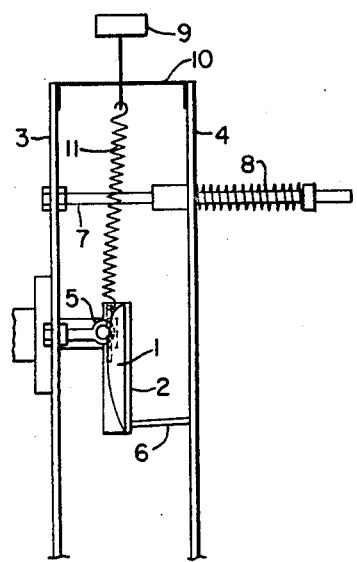
FIG. 2c.
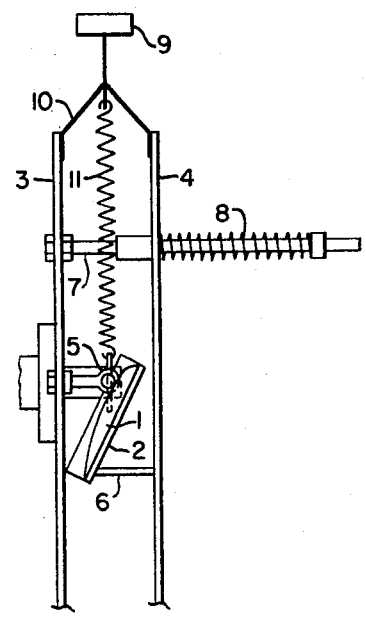

U.S. Patent    Mar. 24, 1981    Sheet 3 of 3    4,257,736
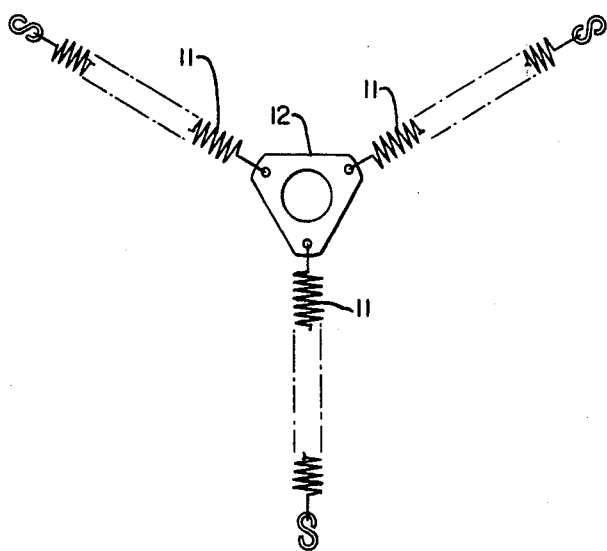
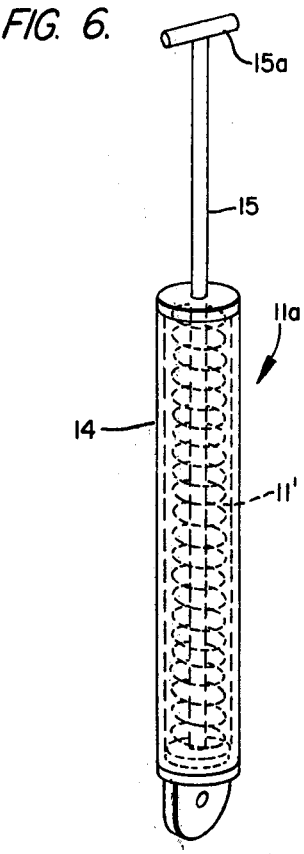
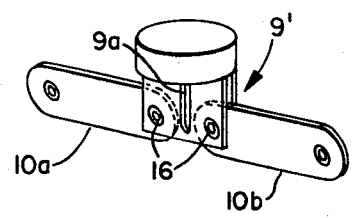
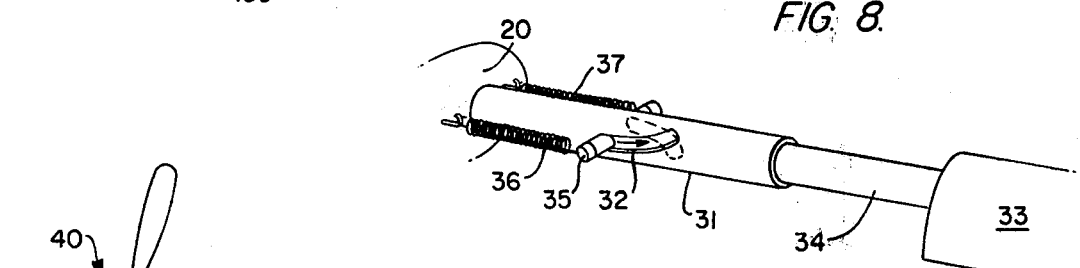
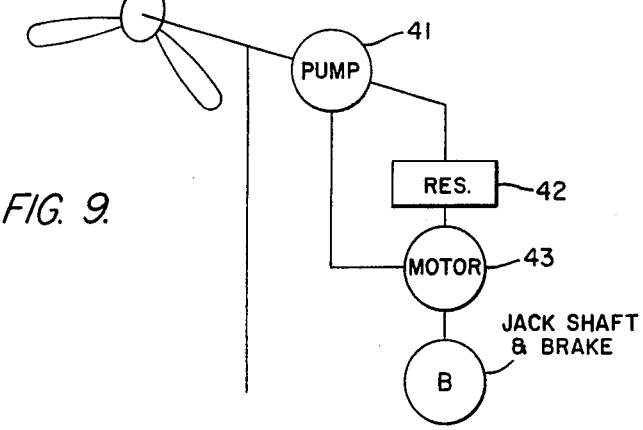

GOVERNED PROPELLER TYPE WIND MOTOR ARRANGEMENT

BACKGROUND AND SUMMARY OF THE INVENTION

The present invention relates to an improvement in horizontal axis, high speed wind generators (aerogenerators) of the type which use an air foil design for the blades and generally from two to four blades in a propeller type configuration to produce rotational motion.

More particularly, the present invention relates to an improved blade angle control for wind generators of the above-noted type.

Wind engine blade wheels are generally of three types. The first two types are designed to operate at very low speeds and are characterized by a blade wheel that has a relatively large blade surface area. This first category of low speed wind engine is the well known "Dutch" wind mill design. The "Dutch" wind mill is highly inefficient and unsuitable for high speed operation. Furthermore, since it has high torque characteristics, low speed start-up is not a significant problem.

The second type of low speed wind engine has been used in this country primarily for the pumping of water and U.S. Pat. No. 458,070 is representative thereof. Since low speed pumping windmills might have sixteen or more blades and are designed to operate at very low speeds under the effect of very low wind forces, no problems exist with respect to start up of such wind motors. Thus, governors need only be provided for adjusting the blade angles ("feathering") to prevent overspeeding. However, such wind motors are not suitable for use in generating electricity since they cannot be operated at the high velocities necessary for efficient electricity generation.

Accordingly, a third, propeller type of blade wheel has been utilized for electricity generation purposes. Such wind generators use an air foil design for the blades and generally from two to four blades to produce rotational motion. Reference can be made to U.S. Pat. Nos. 1,648,837, and 2,248,218 for typical examples thereof. Wind powered electrical generating wheels are designed for operation in the ten to twenty mile per hour windspeed range and are provided with a blade angle governor for preventing overspeeding and for producing a relatively constant speed wheel rotation in said 10-20 mph. wind range.

However, when such wind generators are designed for maximum efficiency in their normal operating range, difficulties arise in starting of the windmill, especially at low wind speeds and when a hydraulic system is utilized to transmit the power from the blade wheel at the top of a tower to its base. The reason for this is that the torque needed to start the blades moving is high, and such propeller type rotors are efficient low torque designs, relative to the above-noted pumping type wheels, due to the difference in exposed blade surface area and designed tip speed ratios of the blades, and this start-up torque problem is further compounded by the torque needed to drive the hydraulic system, especially in cold weather.

Accordingly, it is an object of the present invention to design a wind generating system which appreciably solves the problem with respect to obtaining enough torque for system start up, even in combination with hydraulic systems.

It is a further object of the present invention to solve the start-up problem without the use of auxiliary starter mechanisms, and without affecting normal operational efficiency.

These and other objects are achieved according to the present invention by providing an aerogenerator that has a governing device for the blades which maintains the blades of the rotor wheel at a first angle with respect to the wind so as to create a lower tip speed ratio than would be optimal under normal operating conditions until at least minimal operating conditions are achieved at which time the blade angle is quickly shifted into its normal operating, high efficiency position where it is retained, unless high winds occur, in which case the blades are progressively feathered to prevent overspeeding.

According to a preferred embodiment, the above-noted blade angle adjustment is obtained by pivotally connecting the blades between a pair of parallel spaced plates such that the blade angle is adjusted in accordance with the relative spacing of the plates, a first biasing mechanism being utilized to provide start-up governing control, while a second biasing arrangement is utilized to prevent overspeeding.

These and other features of the present invention will become further apparent from the following detailed description thereof and with reference to the accompanying drawings.

BRIEF DESCRIPTION OF THE DRAWINGS

FIGS. 1A-1D are schematic blade representations for explaining concepts upon which the present invention is based;

FIGS. 2A-2C are partial schematic representations of three governed operating modes according to a first embodiment of the present invention;

FIG. 5 shows one embodiment for high speed governing springs;

FIG. 6 shows a second embodiment of high speed governing springs;

FIG. 7 shows a modified embodiment of a centrifugal governor fly-weight for use with the FIG. 6 feathering spring;

FIG. 8 is a schematic representation of a modified blade pivoting arrangement;

FIG. 9 is a schematic representation of a hydraulic generating system incorporating a blade wheel according to the present invention; and FIGS. 10 and 11 further illustrate blade pivoting arrangements in accordance with the present invention.

DETAILED DESCRIPTION OF THE PREFERRED EMBODIMENTS

Figure 3:
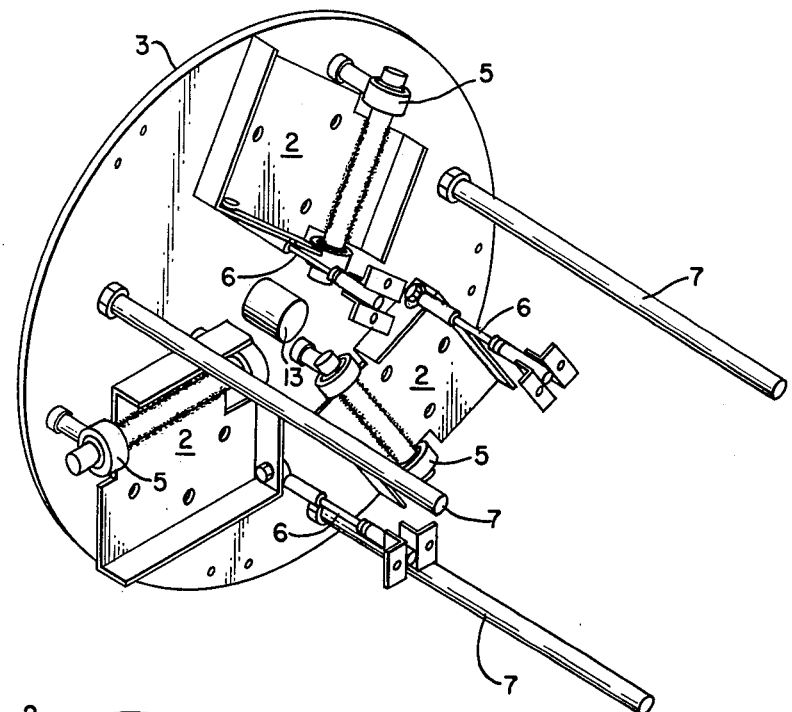
FIG. 3 is a frontal view showing a base plate with blade pivoting hardware attached.

With reference to FIGS. 1a through 1d, some basic principles of wind motors will be described so that the significance of the present invention can be more fully appreciated. FIG. 1a shows a schematic cross section through a blade of a high speed wind generator with the magnitude and direction of the wind represented by the vector $\overline{V}$ when the air foil is at rest. The wind is directed in a direction normal to the axis of the blades of the blade wheel due to the action of a conventional wind steering vane (not illustrated). As shown in FIG. 1b, when the speed of the wind is of sufficient force, the blade 1 begins to rotate with a magnitude and direction shown by the vector $\bar{u}$. The combined effects of the wind and air foil motion cause the air foil to "feel" to the wind from a different direction. This direction is represented by the arrow w in FIG. 1c. Lift (vector $\bar{l}$, FIG. 1c) is produced over the air foil by a combination of the wind plus the air moving over the air foil due to its motion. The lift force is formed of two components, vector $\bar{c}$ and vector $\bar{p}$, which are oriented perpendicular to and coincident with the direction of motion of the air foil, with the rotational motion of the blade system being provided by the force vector c coincident to the direction of motion.

A measure of the effectiveness of a propeller type aerogenerator design is the speed ratio (tip speed ratio) which is the ratio u/v, where u is the blade tip speed and v is the wind velocity. Generally speaking, rotor type blade wheels of the afore-noted water pumping type have a speed ratio in the 1:3 range, while propeller type aerogenerators are designed with a speed ratio of 5 or above. Since, as a general rule, the lower the speed ratio is, the greater the starting torque is, but the lower the efficiency of the blade wheel at higher speeds, the above-noted pumping type rotor blade wheel produces high torque, low rpms and high losses, while propeller type aerogenerators have low starting torques, high rpms and greater efficiency.

As can be seen from the foregoing discussion, there are competing interests, with respect to tip speed ratios, between starting characteristics (which are improved with lower speed ratios) and efficient high speed operation (which is obtainable through higher speed ratios). The present invention seeks to obtain the good low speed starting characteristics attributable to low speed ratios without adversely effecting the operating efficiency of the aerogenerator attributable to higher speed ratios.

It is known that the speed ratio is determined by the blade angle L (FIG. 1d) between the wind speed vector $\bar{u}$ and the air foil cord line, such that by changing the blade angle L, the speed ratio can be increased or decreased. This concept has been applied to wind engines such as that of the above-noted U.S. patent, so as to obtain high speed feathering to prevent overspeeding.

However, a centrifugal governor such as is utilized in the above-cited U.S. patent does not come into effect until overspeeding conditions exist due to the use of counterbalancing springs for preventing premature feathering. Furthermore, attempts by applicant to vary the spring tensioned so as to adapt such prior art centrifugal governors for use in achieving a start-up blade adjustment have proved unsuccessful because, if a spring tension is selected which is low enough to permit adjustment from a start-up high torque blade position to an efficient operating blade position at speeds corresponding to normal operating speeds, then the blades feather-out within the normal operating ranges and long before it is necessary to prevent overspeeding. On the other hand, if a high enough spring force is used to properly control and prevent premature high speed feathering, optimum speed ratios are not reached until approximately 50 miles per hour as opposed to the normal 10 to 20 mile per hour range.

Turning now to FIGS. 2a–2c, schematic representations are shown of a first embodiment of a governing arrangement according to the present invention which achieves control over the angle of attack of the air foil blades of a propeller type, high speed aerogenerator so as to achieve a high torque, low tip speed ratio orientation during start-up conditions (FIG. 2a), an optimum high efficiency speed ratio orientation under normal operating speeds (FIG. 2b) and air foil blade feathering at excessive rotational speeds (FIG. 2c).

As seen in FIGS. 2a–2c, an air foil blade 1 is received at its innermost end by a blade mounting member 2. The mounting member is pivotably mounted to a first hub plate 3 and to a second hub plate 4 by pivotal connectors 5 and 6, respectively. The pivotal connection 5 is approximately one-quarter of the way from the leading edge of the air foil 1, while the pivotal connection 6 is at the trailing edge thereof. This selection of pivotal connector points acts to eliminate moments from being exerted by the blade itself which would act to twist the blade from its rest position shown in FIG. 2a. The frontal plate 4 is guided on guide rods 7 (only one being shown) which are mounted to the rear plate 3. Light springs 8, which can be coil springs mounted about the rods 7, keep the front plate in the position shown in FIG. 2a when the wind motor is at rest or is being brought up to normal operating speed. While the spring length itself can be sufficient to hold the plate 4 in its rest position if secured thereto, preferably the mounting hubs are used as stops against which the plate 4 is held by the springs 8 via links 6.

As the wind motor is brought up to speed, the fly ball weight 9 connected to the hinge 10 experiences the effects of increasing centrifugal force. However, radially outward movement of the fly ball weight 9 is prevented so long as the centrifugal forces are insufficient to overcome the force exerted by the springs 8 since the springs 8 act to prevent outward movement of the plate 4 with respect to the plate 3 and therefore, opening of the hinge is precluded.

Once the rotational speed of the blade wheel reaches at least a minimum normal operational speed (such as 10 mph), the centrifugal force exerted by the fly ball 8, 9 becomes great enough to overcome the force of the springs 8 and the fly ball 9 and hinge 10 abruptly shift from their FIG. 2a position to their FIG. 2b position bringing the air foil blade 1 to an angular position producing a second, high efficiency, relatively high tip speed ratio arrangement. This angular orientation is maintained throughout the normal operational range (e.g. 10–20 mph) because a second spring 11, of higher load rating than spring 8, precludes further radial outward movement of the fly weight 9. The spring 11 is of sufficient length so that it does not exert any appreciable force upon the fly weight arrangement until it assumes the FIG. 2b position.

Should wind speeds cause the blade wheel rotational speed to increase beyond a desired level set by the rating of the spring 11, centrifugal force will cause the fly weight to overcome the force exerted by the spring 11, such that the hub plates 3 and 4 will be caused to come closer together thereby shifting the angle of the air foil 1 and causing a feathering of the wind motor so as to prevent overspeeding.

FIG. 3 is a view of the rear hub plate 3 for a blade wheel utilizing a 3 bladed configuration. Mounted to the hub plate 3 are three blade mounting pivot plates 2 with pivotal connections 5, and pivotal linkage arms 6 for connecting to the front hub plate. Also shown are three guide rods 7.

Figure 4:
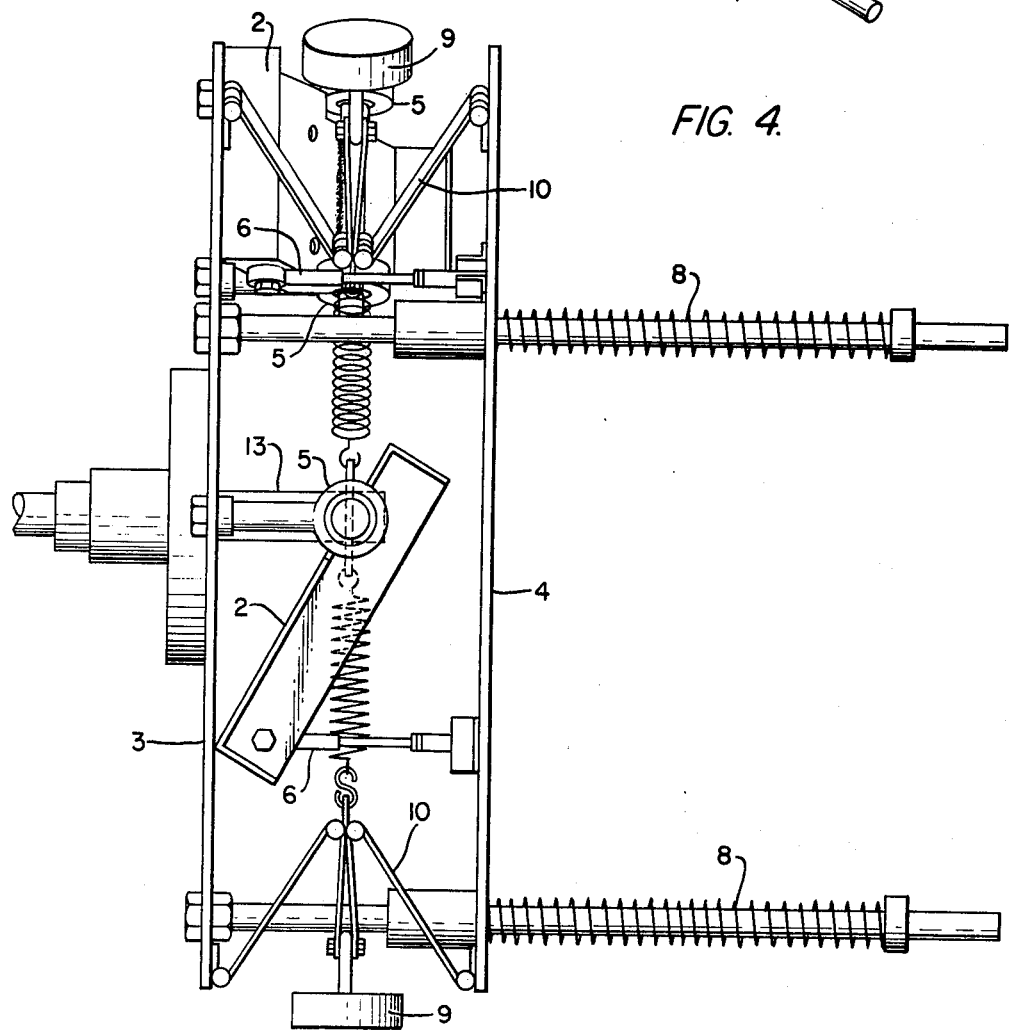
FIG. 4 is a side view of a blade wheel with blades removed.

In FIG. 4, the arrangement of FIG. 3 can be seen with the front plate 4 spring biased towards the rear plate 3 under the action of three springs 8, and with the fly weight 9 connected between the hub plates 3, 4 by the hinges 10. In this regard, while only two fly weights are shown, with the three bladed configuration, three weights would be used, one positioned between each adjacent pair of blades.

FIG. 5 shows a high speed governing spring arrangement for use with the blade wheel hub of FIGS. 3 and 4. Three springs 11 are connected to a washer member 12. The washer member 12 fits over the drive shaft 13. The outer ends of the springs 11 are provided with connectors for linking each of them to a respective hinge 10.

In FIGS. 6 and 7 a modified high speed governing arrangement is shown which can advantageously be utilized instead of the arrangement shown in FIGS. 4 and 5. Instead of tension spring 11, a compression spring arrangement (shown generally at 11a) is formed by a cylinder 14 within which a piston member 15 is displaceable in opposition to the force of compression spring 11'. The end of the piston 15 is provided with a cross piece 15a which is received within slots 9a in a pair of plates extending from modified fly weight 9'. Links 10a, 10b are then pivotally connected to the fly weight 9' by pivot pins 16 so as to create a hinge arrangement analogous to hinge 10.

By way of example, it has been found advantageous to construct an aerogenerator incorporating the FIGS. 6 and 7 modifications by utilizing a feathering spring 11' having an initial length of 7 inches, a compressed length of 3 inches, and a spring constant of 3.75 lbs/⅛ in., with a fly ball weight 9' of 1.75 lbs., and further in combination with 16 foot long GA(w)-2 air foil blades having a designed maximum tip speed ratio of 5.7, held between hub plates 3, 4 of 18 inch diameter and 6 inch maximum spacing in the FIG. 2b position. In the FIG. 2a position, the blade tip speed ratio is 3, the initial spring tension is 4.75 lbs. exerted by springs 8 having no more than a 30 lb./in. spring constant. At approximately 12 mph the FIG. 2b position will be achieved and spring 9' will be compressed to 5 inches so as to apply a 45 lb. force on each weight 9' with the blade assuming a tip speed ratio of 5.7. At 273 rpms the blades will begin feathering toward a minimum tip speed ratio of 1.75.

While the preferred arrangements described above utilize a separate governing arrangement for regulating the blade angular position (and, accordingly, its tip speed ratio), it is contemplated within the scope of the present invention to incorporate the governing arrangement into the blade arrangement itself. One such arrangement is illustrated schematically in FIG. 8. In this arrangement, a blade wheel hub 20 is provided with sleeves 31 corresponding in number to the number of the blades carried by the blade wheel. The sleeves 31 are provided with arcuate slots 32 on opposite sides of the sleeve 31. Each blade 33 is connected with a rod 34 at its radially inwardly directed end, which rod 34 is received within the sleeve 31. A pin 35 extends through the slot 32 on one side of the sleeve 31, then through the rod 34, and then back out of the sleeve through the slot 32 on the opposite side of the sleeve 31. Spring arrangements 36 and 37, corresponding to springs 8 and 11, are connected at one end to the hub 20 and at the other end to either the guide pin 35 or the rod 34. The load rating of the spring arrangements 36, 37 is chosen so as to correspond to the centrifugal force that will be exerted by the blade 33.

The FIG. 8 arrangement operates as follows. Spring arrangement 36 will hold pin 35 against the radially innermost end of the slot 32 which is set so as to orient the blade in a high torque, low tip speed ratio starting position. As the blade wheel picks up speed, centrifugal force acts upon the blade 3 which would cause it to move radially outwardly but for the action of spring arrangement 36. The load rating of the spring arrangement 36 is set so that once the blade wheel reaches at least a minimum normal operating speed, the effects of centrifugal force upon the blade will be sufficiently great to overcome the biasing force of the spring arrangement 36 so that the blade 33 will be caused to move radially outwardly pulling the pin 35 along the slot 32 as the rod 34 is pulled out of the sleeve 31. The guide slot 32 functions as a cam and the pin 35 as a cam follower, such that the angular position of the blade will be changed as the pin moves along the slot 32. The spring arrangement 37 is constructed so that it does not come into play, like the spring 11, until the blade reaches a position corresponding to that of FIG. 2b such that the shift occurs in a rapid, jump-like movement. The blade 33 is then held from further radial outward movement until desired operational speeds are exceeded at which time, due to the selection of the load rating of spring arrangement 37, centrifugal forces will be great enough to overcome the effects of spring 37 and a feathering action will be achieved as the pin 35 resumes its movement along the slot 32 toward the radially outermost end thereof.

While the FIG. 8 arrangement can be advantageous, it does create a danger nonexistent in the other discussed arrangements in that, if any of the rods 32 should stick or jam, the other two could move independently and have different blade angles. This would set up tremendous vibrations in the system and be self-destructive if other safety shut-down features are not incorporated into the system.

Further air foil blade angle adjustment arrangements are also contemplated within the scope of the present invention incorporating the use of hydraulic pistons. Such systems would correspond to that illustrated in FIGS. 2a-4 with the following exceptions. In one arrangement (FIG. 10) the hinges 10 are retained, but the fly weights 9 have been deleted. A hydraulic piston cylinder unit 111 is interconnected between the hinge 10 and the drive shaft in the same manner as the springs 11 (which are deleted) and is controlled in response to rotational speed changes (by any conventional speed responsive means) so as to displace the hinge 10 inwardly and outwardly in the same manner noted above with respect to the arrangement of FIGS. 2a-2c. Likewise, the same operation can be achieved according to a still further embodiment by elimination of the hinges altogether (as well as the springs and fly weights) with a plurality of piston and cylinder units 108 being interconnected directly between the plates 3, 4 parallel to the rods 7 so as to control the angle of the air foil blades by increasing and decreasing the relative space between the plates 3, 4 (FIG. 11). While the use of such hydraulic systems would increase the expense of the governor blade wheel arrangement, such systems could provide a greater degree of flexibility and be advantageous in large-scale wind generation systems.

As noted in the Background of the Present Invention, the present invention is particularly useful as part of an aerogenerator system wherein a hydraulic arrangement is utilized to transmit the power produced by the blade wheel from a tower top to which it is mounted to its base. One such arrangement is schematically illustrated in FIG. 9. In FIG. 9, a blade wheel of a Clark Y configuration is shown generally at 40 and is mounted upon a drive shaft which drives a pump 41 at the tower top. The pump is connected via hydraulic circuitry to a reservoir 42, motor 43, and jack shaft and brake 44.

While I have shown and described various embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. A propeller type wind motor arrangement comprising:
   (a) a blade mounting hub;
   (b) a plurality of air foil blades;
   (c) blade receiving means for mounting said blades to said hub for pivotal movement about a longitudinal axis of said blades; and
   (d) governor means for retaining said blades at a first high torque, relatively low tip speed ratio forming angle during motor start-up and at rotational speeds below a minimum normal operational speed, and for abruptly shifting said blades to a second high efficiency, relatively high tip speed ratio forming angle when said operational speed is reached.

2. A wind motor arrangement according to claim 1, wherein said governor means includes means responsive to the speed of said blades for effecting angular changes thereof.

3. A wind motor arrangement according to claim 2, wherein said governor means includes spring means for retaining said blades in said first position until said minimum speed is reached.

4. A wind motor arrangement according to claim 2, wherein said mounting hub comprises first and second hub plates, and wherein said blade receiving means comprises a blade control plate for each of said blades, said control plate being pivotally mounted to said first hub plate, wherein said governor means comprises pivotal link means, connected between said second hub plate and said control plate, for drivingly connecting said second hub plate and said control plate, and means for shifting said second hub plate relative to said first hub plate.

5. A wind motor arrangement according to claim 4, wherein said means for shifting comprises a plurality of hinges interconnecting said hub plates, and weight means associated therewith for adjusting the spacing between said plates under the effect of centrifugal force.

6. A wind motor arrangement according to claim 5, comprising first spring means of a first load rating for restricting relative movement between said hub plates, upon motor start-up, under the influence of said means for shifting until said minimum operational speed is reached and second spring means of a second load rating higher than that of said first spring means for restricting adjustment of said blades from said second tip speed ratio forming angle, upon further increases in speed, until speeds in excess of normal operational speeds are reached.

7. A wind motor arrangement according to claim 2, wherein said governor means includes cam and cam follow means associated with one of said blade and blade receiving means, respectively, for adjusting the angular orientation of the blades in response to radial movements thereof with respect to the mounting hub.

8. A wind motor arrangement according to claim 4, wherein said means for shifting comprises hinge means interconnected between said hub plates and fluid piston-cylinder means connected to said hinge means for adjusting the spacing between said plates.

9. A wind motor according to claim 4, wherein said means for shifting comprises fluid piston-cylinder means interconnected between said hub plates for varying the spacing therebetween.

10. A wind motor according to claim 1, wherein said hub is rotatably mounted upon a tower and hydraulic circuit means are provided for transmitting power produced by said blades to a base area of the tower.

11. A wind motor according to claim 6, wherein said second spring means comprises a cylinder within which a piston member is displaceable in opposition to the force of a compression spring located in said cylinder, said piston member having a piston rod which is slidably received within a slot formed in said weight means.

* * * * *